United States Patent [19]

Graber et al.

[11] Patent Number: 4,848,112
[45] Date of Patent: Jul. 18, 1989

[54] LOCKABLE ROTARY ATTACHMENT DEVICE

[75] Inventors: Joseph V. Graber, Boca Raton, Fla.; Ervin L. Severson, Oregon, Wis.

[73] Assignee: Graber Products, Inc., Madison, Wis.

[21] Appl. No.: 233,267

[22] Filed: Aug. 17, 1988

[51] Int. Cl.⁴ .............................................. F16B 41/00
[52] U.S. Cl. ...................................... 70/231; 70/223; 70/258; 224/315
[58] Field of Search ................................. 70/209–211, 70/215–218, 221–223, 229–232, 258; 224/315, 322

[56] References Cited

U.S. PATENT DOCUMENTS

| | | | |
|---|---|---|---|
| 1,252,567 | 1/1918 | Hancock et al. | 70/223 X |
| 1,608,593 | 11/1926 | Gillett | 70/223 X |
| 1,629,015 | 5/1927 | Axelson | 70/231 |
| 1,786,201 | 12/1930 | Fishback | 70/231 |
| 1,875,734 | 9/1932 | Hurd | 70/231 X |
| 1,970,660 | 8/1934 | La Fever | 70/231 X |
| 2,143,925 | 1/1939 | Schlitters et al. | 70/231 |
| 2,534,446 | 12/1950 | Howard | 70/231 |
| 3,796,074 | 3/1974 | Vik | 70/231 |
| 4,336,698 | 6/1982 | Hurd | 70/231 |
| 4,441,344 | 4/1984 | Kupershoek | 70/231 |
| 4,747,528 | 5/1988 | Kamaya | 224/315 |

FOREIGN PATENT DOCUMENTS

| | | | |
|---|---|---|---|
| 85683 | 9/1921 | Austria | 70/223 |
| 7908505 | 6/1981 | Netherlands | 224/315 |

Primary Examiner—Gary L. Smith
Assistant Examiner—Douglas E. Ringel
Attorney, Agent, or Firm—Vernon J. Pillote

[57] ABSTRACT

A lockable rotary attachment device including an axially threaded attachment member having an externally splined drive head and a flange defining oppositely facing annular shoulders, and a knob mounted for axial translation on the attachment member between first and second axial positions on the attachment member. The knob is freely rotatable relative to the attachment member in the first axial position and has an internally splined socket for non-rotatably receiving the drive head when in the second axial position. A lock is mounted on the knob for moving a latch member between a first latch position in which it is disposed outwardly of the flange on the attachment member to allow axial translation of the knob between the first and second axial positions, and a second latch position disposed radially inwardly of the flange for engagement with the first shoulder when the knob is in its first axial position and for engagement with the second shoulder when the knob is in its second axial position.

9 Claims, 1 Drawing Sheet

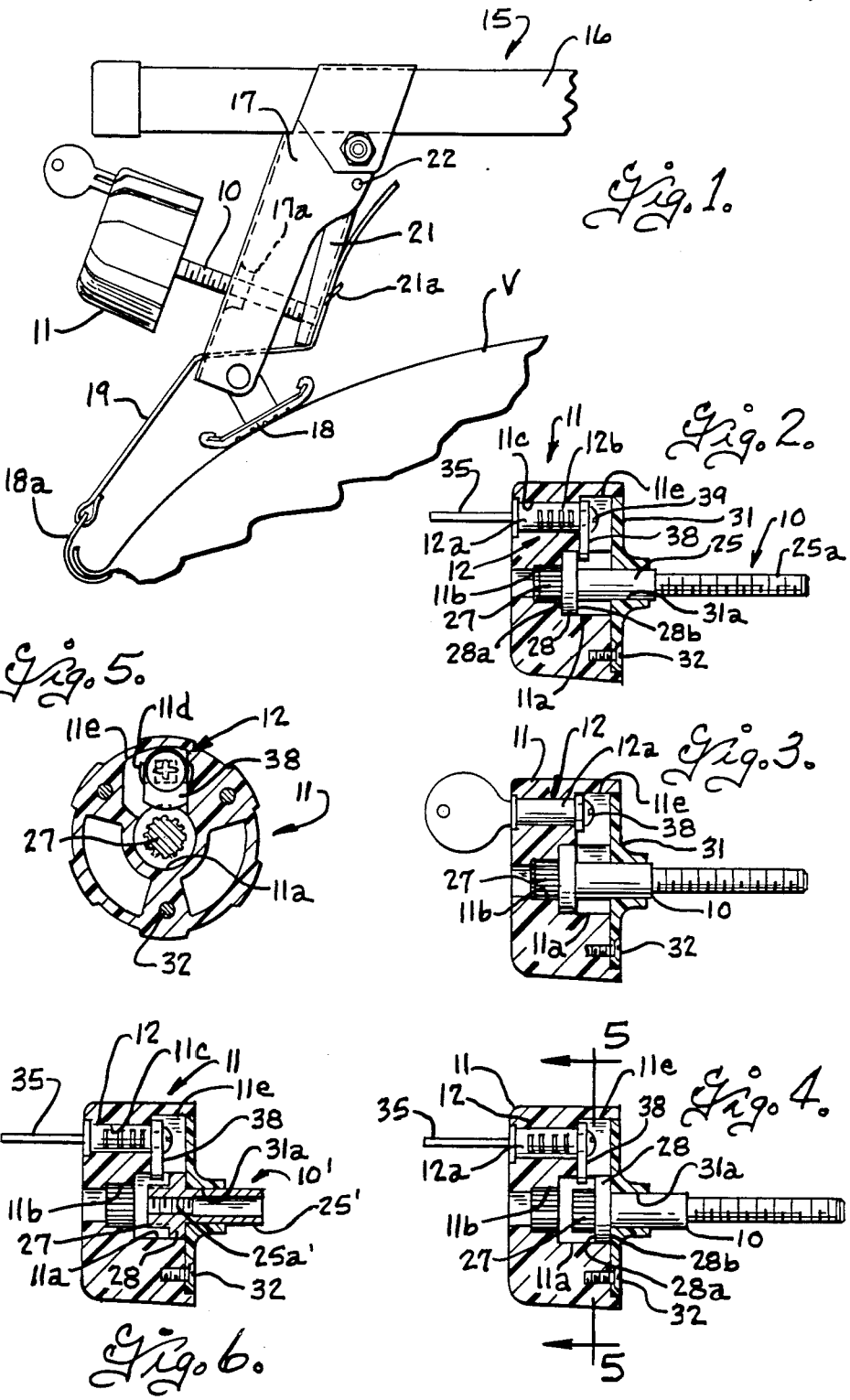

LOCKABLE ROTARY ATTACHMENT DEVICE

BACKGROUND OF THE INVENTION

The present invention relates to a lockable rotary attachment device and particularly to a lockable rotary attachment device of the type having an axially threaded attachment member, a knob for rotating the attachment member, and a key controlled clutch mechanism for drivingly interconnecting the knob and the attachment member. Such lockable rotary attachment devices are used for clamping or securing various articles or devices together to impede theft. Some prior lockable rotary attachment devices such as disclosed in U.S. Pat. Nos 1,875,734; 1,970,660; 3,796,074; 4,336,698 and 4,441,344, arrange a key operated lock so that it moves a clutch mechanism into an engagement position to drivingly connect the knob to the threaded attachment member. However, such devices are somewhat tedious to operate since it is frequently necessary to angularly manipulate the rotary knob while turning the key operated lock in order to allow the clutch mechanism to move into an engaged position. Some other lockable rotary attachment devices such as disclosed in U.S. Pat. Nos. 1,786,201; 2,143,925 and 2,534,446 are arranged to lock the knob only in a disengaged position in which the knob can turn freely relative to the rotary attachment member. Further, in some rotary attachment devices, the torque applied to the knob to turn the attachment member is transmitted in whole or in part through the key operated lock and can result in damage to the lock or failure of the lockable attachment device. In addition, prior lockable rotary attachment devices were generally relatively complex and expensive to manufacture.

SUMMARY OF THE INVENTION

It is the general object of the present invention to overcome the disadvantages of the prior art by providing a lockable rotary attachment device which is simple to operate; in which the knob can be locked in either an engaged or disengaged condition in the threaded attachment member; in which the torque applied to the knob for turning the threaded attachment member is not transmitted through the key operated lock; and which is of simple and economical construction.

Accordingly, the present invention provides a lockable rotary attachment device comprising an axially threaded attachment member having a head portion including an externally splined drive head and first and second shoulders coaxial with the threaded attachment member, a knob mounted on the attachment member for axial translation relative thereto be ween first and second axial positions, the knob being freely rotatable about the axis of the attachment member when in the first axial position and having an externally splined socket for non-rotatably receiving the drive head when in the second axial position. A lock is mounted on the knob and has a lock plug rotatable relative to the knob about a lock axis radially offset from the axis of the attachment member, and a latch member mounted for movement with the lock plug between a first latch position disposed radially outwardly of the shoulder on the attachment member to allow axial translation of the knob relative to the attachment member, and a second latch position disposed radially inwardly of the shoulders for engagement with the first shoulder when the knob is in the first axial position to restrain the knob against axial translation out of the first axial position and for engagement with the second shoulder when the knob is in the second axial position to restrain the knob against axial translation out of the second axial position.

BRIEF DESCRIPTION OF THE DRAWINGS

FIG. 1 is a fragmentary view of a vehicle attached carrier having the lockable rotary attachment device of the present invention applied thereto;

FIG. 2 is a longitudinal sectional view through the locking device illustrating the knob locked in an engaged position;

FIG. 3 is a longitudinal sectional view through the locking device illustrating the lock in a release position to allow the knob to be axially translated between an engaged an is engaged position;

FIG. 4 is a longitudinal sectional view through the locking device illustrating the knob locked in a disengaged position;

FIG. 5 is a transverse sectional view taken on the plane 5—5 of FIG. 4; and

FIG. 6 is a longitudinal sectional view through a locking device having an internally threaded attachment member.

DETAILED DESCRIPTION OF THE PREFERRED EMBODIMENTS

The lockable rotary attachment device of the present invention in general includes an axially threaded attachment member 10, a knob 11 mounted on the attachment member, and a lock 12 for selectively locking the knob in an engaged position in which rotation of a knob will rotate the attachment member 10, and in a disengaged position in which the knob is freely rotatable relative to the attachment member. The device provides a lockable threaded fastener which can be used for attaching or clamping various articles or devices together. The lockable rotary attachment is shown in FIG. 1 applied to an article carrier 15 for attaching the article carrier to a vehicle v to impede theft of the carrier and/or articles thereon, it being apparent that a lockable rotary attachment device can also be used to attach or clamp articles to the article carrier to impede theft of the articles from the carrier. As shown in FIG. 1, the article carrier 15 includes a cross frame member 16 and legs 17 supported by vehicle engaging feet 18 on a portion of the vehicle body. In the carrier illustrated, a vehicle engaging hook 18a is provided at the end of a flexible strap 19 and the strap is attached to a hook 21a on a lever 21 that is pivotally mounted at 22 on the leg 17. The threaded attachment member 10 of the attachment device is threadedly mounted in a boss 17a on the leg and engages the lever 21 so that turning of the threaded attachment member in one direction will move the lever 21 away from the leg 17 and tighten the strap to firmly clamp the carrier to the vehicle.

Referring more specifically to FIGS. 2–5, the threaded attachment member 10 includes a shank portion 25 and a head portion having an externally splined drive head 27 and a flange 28 defining first and second shoulders 28a and 28b coaxial with the attachment member. The knob 11 has a cavity 11a for receiving the head portion of the attachment member and a base member 31 is detachably secured as by fasteners 32 to one side of the knob to extend across one end of the cavity 11a. The base member 31 has a passage 31a therethrough for slidably and rotatably engaging the shank portion 25 of the attachment member and the cavity 11a is shaped to allow free rotation of the knob relative to the head portion of the attachment member when the knob is in the first axial position shown in FIG. 4. The knob cavity also includes an internally splined socket portion 11b formed generally complementary to the externally splined drive head 27, for non-rotatably receiving the drive head when the knob is in the second axial position shown in FIGS. 2 and 3. In the preferred embodiment illustrated, the externally splined drive head has a plurality of uniformly spaced ribs with intervening grooves to mate with the socket 11b in a plurality of angular positions. It is deemed apparent, however, that the externally splined drive head could have various different polygonal cross-sections such as a square, hexagon, etc. and the term "splined" as used herein is intended to cover such alternative cross-sectional configurations.

The knob 11 is formed with a generally cylindrical lock receiving passage 11c at a location radially offset from the attachment member and generally parallel thereto, and the lock receiving passage has at least one tumbler receiving channel 11d (see FIG. 5) alongside the lock receiving cavity. The lock 12 is of the key operated type having a lock plug 12a that is rotatable in the cavity 11c, and tumblers 12b that are operated by a key 35. As is conventional, the lock tumblers 12b are retracted into the plug when the key is inserted into the lock to allow rotation of the plug, and are yieldably biased outwardly to extend into the channel 11d in the knob, when the key is retracted.

The knob 11 is also formed with a latch receiving cavity 11e that extends from the end of the lock passage 11c to the cavity 11a, and a latch member 38 is fixedly attached to a polygonal inner end on the lock plug 12a as by a fastener 39 for turning with the lock plug when the latter is rotated about the plug axis. The latch cavity 11e is shaped to allow the latch member to be turned through an angle between a first latch position in which the latch member 38 is disposed radially outwardly of the flange 28 on the attachment member, as shown in FIG. 3, and a second latch position in which the latch member extends radially inwardly of the head receiving cavity 11a, , as shown in FIGS. 2, 4 and 5. Advantageously, the edges of the latch receiving cavity are shaped to engage and stop rotation of the latch member in one direction when it reaches the first latch position and to engage and stop rotation of the latch member in the opposite direction, when it reaches the second latch position.

When the latch member is disposed in its first latch position in which it is radially outwardly of the flange on the attachment member, the knob can be moved axially relative to the threaded attachment member between a first axial position in which the drive head 27 is disengaged from the internally splined socket in the knob, to allow free rotation of the knob relative to the attachment member, and a second axial position in which the drive head 27 extends into the splined socket 11b in the knob, to drivingly connect the knob to the attachment member. The lock 12 can be actuated to rotate the latch 38 from the first latch position to the second latch position for engagement with the first shoulder 28a on the flange, when the knob is in the first axial position shown in FIG. 4, to restrain the knob against movement out of the first axial position. The lock 12 can also be operated to move the latch member from the first to the second latch position for engagement with the second shoulder 28b on the attachment member, when the knob is in the second axial position as shown in FIG. 2, to restrain the knob against movement out of the second axial position.

The cavity 11a in the knob is advantageously constructed and arranged to guidably engage the periphery of the annular flange 28 on the attachment member, to aid in guiding the knob between the first and second axial positions on the attachment member. In addition, the cavity 11a is advantageously arranged to engage the shoulder 28a on the flange when the knob is in its second axial position as shown in FIG. 3, and the base member 31 arranged to engage the shoulder 28b on the flange when the knob is in its first axial position as shown in FIG. 4, to limit axial translation of the knob.

The threaded attachment member shown in the embodiments of FIGS. 1–3 has an externally threaded portion 25a on the stem 25. The embodiment shown in FIG. 6 is the same as FIGS. 1–5 and the same numerals are used to designate the same parts and like numerals followed by the postscript' used to designate modified parts. In this embodiment, the stem 25' on the rotary attachment member 10' has an internally threaded portion 25a', to receive a stud or bolt.

From the foregoing it is believed that the construction and operation of the lockable rotary attachment device Will be readily understood. The lock 12 can be operated to move the latch member 28 to a first latch position disposed outwardly of the periphery of the flange 28 on the attachment member, so that the knob can be moved axially relative to the attachment member between a first axial position shown in FIG. 4 and a second axial position as shown in FIGS. 2 and 3. The lock can be operated to its second or latch position after the knob has been moved to either the first axial position or the second axial position, so that it is not necessary to simultaneously angularly position the knob relative to the attachment member, during actuation of the lock. Thus, the lock can be operated to its latch position to lock the knob in the first axial position relative to the attachment member as shown in FIG. 4, in which the knob is freely rotatable relative to the attachment member, and the lock can also be operated to move the latch to its second latch position when the knob is in the second axial position as shown in FIG. 2, in which the knob is drivingly connected to the drive head on the attachment member. In addition, when the latch 38 is in its first position shown in FIG. 3, the knob can be manipulated by one hand to turn the attachment device in step fashion in either direction without releasing the knob. For example, the knob can be moved axially to an engaged position; turned in one direction to turn the attachment member; moved axially to a disengaged position and then turned in the opposite direction back to the initial angular position without corresponding turning of the attachment member, and such a cycle can be repeated a number of times as desired to either tighten or loosen the threaded fastener.

The lockable rotary attachment device of the present invention utilizes very few parts and does not require the use of springs to effect engagement or disengagement of the drive connection between the knob and attachment member. The lockable rotary attachment device can be economically fabricated and assembled and is durable in use.

The embodiments of the invention in which an exclusive property or privilege is claimed are defined as follows:

1. A lockable rotary attachment device for attaching or clamping articles together comprising, an axially threaded attachment member having a shank portion and a head portion, the head portion, the head portion having an externally splined drive head coaxial with the shank portion and first and second shoulders coaxial with the shank portion, a knob mounted on the attachment member for axial translation relative thereto between first and second axial positions on the attachment member, the knob being freely rotatable about the axis of the attachment member when in the first axial position and having an internally splined socket for non-rotatably receiving the drive head when in the second axial position, a lock mounted on the knob for movement therewith and having a lock plug rotatable relative to the knob about a lock axis radially offset from the axis of the attachment member, a latch member mounted for movement with the lock plug between a first latch position disposed radially outwardly of the first and second shoulders to allow axial translation of the knob relative to the attachment member and a second latch position disposed radially inwardly of said shoulders for engagement with said first shoulder when the knob is in said first axial position to restrain the knob against axial translation out of said first axial position and for engagement with the second shoulder when the knob is in said second axial position to restrain the knob against axial translation out of the second axial position.

2. A lockable rotary attachment device according to claim 1 wherein said knob has a base wall at one side slidably and rotatably engaging said shank portion.

3. A lockable rotary attachment device according to claim 1 wherein said knob has a base wall at one side slidably and rotatably engaging said shank portion, said head portion including an annular flange adjacent one end of said drive head, said first and second shoulders being disposed at relatively opposite sides of said flange, said knob having means for guidably engaging said annular flange during axial translation of the knob between said first and second axial positions.

4. A lockable rotary attachment device according to claim 1 wherein said head portion includes an annular flange adjacent one end of said drive head, said first and second shoulders being disposed at relatively opposite sides of said flange.

5. A lockable rotary attachment device according to claim 1 wherein said head portion includes an annular flange adjacent one end of said drive head, said first and second shoulders being disposed at relatively opposite sides of said flange, said knob having means for guidably engaging the outer periphery of said annular flange during axial translation of the knob between said first and second axial positions.

6. A lockable rotary attachment device according to claim 1 wherein said head portion includes an annular flange intermediate the ends of the attachment member, said first and second shoulders being disposed at relatively opposite sides of said flange, said drive head being located adjacent one end of the attachment member.

7. A lockable rotary attachment device for attaching or clamping articles together comprising an axially threaded attachment member having a shank portion and a head portion, the head portion having an externally splined drive head and an annular flange intermediate the drive head and the shank portion, the flange defining first and second annular shoulders at relatively opposite sides, a knob having a cavity for receiving the head portion and a base member attached to the knob at one side and slidably and rotatably engaging the shank portion of the attachment member, the knob being axially movable relative to the attachment member between first and second axial positions, the cavity being shaped to allow free rotation of the knob relative to the head portion when the knob is in the first axial position and the cavity having an internally splined socket for non-rotatably receiving the drive head when the knob is in the second axial position, a lock mounted on the knob for movement therewith and having a lock plug rotatable relative to the knob about a lock axis radially offset from the axis of the attachment member, a latch member mounted for movement with the lock plug between a first latch position disposed radially outwardly of the flange to allow axial movement of the knob relative to the attachment member and a second latch position disposed radially inwardly of the flange for engagement with the first shoulder when the knob is in said first axial position to restrain the knob against movement out of said first axial position and for engagement with the second shoulder when the knob is in said second axial position to restrain movement of the knob out of the second axial position.

8. A lockable rotary attachment device according to claim 7 wherein said cavity has wall means for guidably engaging said annular flange during movement between said first and second axial positions.

9. A lockable rotary attachment device according to claim 8 wherein said base member is adapted to engage said annular flange when the knob is in said first axial position.

* * * * *